US010838651B2

United States Patent
Lin et al.

(10) Patent No.: US 10,838,651 B2
(45) Date of Patent: *Nov. 17, 2020

(54) DATA BACKUP SYSTEM AND METHOD THEREOF WHEREIN TARGET DATA (IN SOURCE STORAGE) IS ARRANGED ACCORDING TO DEFECT TABLE OF TARGET STORAGE

(71) Applicant: RayMX Microelectronics, Corp., Anhui province (CN)

(72) Inventors: Wang-Sheng Lin, New Taipei (TW); Cheng-Yu Chen, New Taipei (TW)

(73) Assignee: RAYMX MICROELECTRONICS CORP., Anhui Province (CN)

( * ) Notice: Subject to any disclaimer, the term of this patent is extended or adjusted under 35 U.S.C. 154(b) by 61 days.

This patent is subject to a terminal disclaimer.

(21) Appl. No.: 16/282,449

(22) Filed: Feb. 22, 2019

(65) Prior Publication Data

US 2019/0187910 A1 Jun. 20, 2019

Related U.S. Application Data

(63) Continuation of application No. 15/260,036, filed on Sep. 8, 2016, now Pat. No. 10,216,451.

(30) Foreign Application Priority Data

Sep. 25, 2015 (TW) .............................. 104131776 A

(51) Int. Cl.
*G06F 3/06* (2006.01)
*G06F 12/02* (2006.01)

(52) U.S. Cl.
CPC .............. *G06F 3/065* (2013.01); *G06F 3/061* (2013.01); *G06F 3/0688* (2013.01); *G06F 12/0246* (2013.01); *G06F 2212/7201* (2013.01)

(58) Field of Classification Search
CPC ........ G06F 3/065; G06F 3/0688; G06F 3/061; G06F 12/0246; G06F 2212/7201
See application file for complete search history.

(56) References Cited

U.S. PATENT DOCUMENTS

| | | | | |
|---|---|---|---|---|
| 5,875,478 A | ‡ | 2/1999 | Blumenau | G06F 11/1458 711/162 |
| 6,453,383 B1 | ‡ | 9/2002 | Stoddard | G06F 3/0607 707/999.202 |

(Continued)

FOREIGN PATENT DOCUMENTS

| | | | |
|---|---|---|---|
| TW | 440766 | ‡ | 6/2001 |
| TW | 4407656 | ‡ | 6/2001 |
| TW | 201025005 | ‡ | 7/2010 |

OTHER PUBLICATIONS

Office Action letter of the counterpart Taiwan application 104131776 dated Nov. 18, 2016.‡

(Continued)

*Primary Examiner* — William B Partridge
*Assistant Examiner* — Chie Yew
(74) *Attorney, Agent, or Firm* — McClure, Qualey & Rodack, LLP

(57) ABSTRACT

A data backup method for backing up target data, through a driver module, from a first storage device to a second storage device is disclosed. The first storage device includes a first storage unit that stores the target data, and a first control unit that accesses the first storage unit based on a first logical-to-physical mapping table. The second storage device includes a second storage unit and a second control unit that accesses the second storage unit based on a second logical-to-physical mapping table. The method includes steps of: reading the target data from the first storage unit without accessing the first logical-to-physical mapping table and transmitting the target data to the driver module; transmit- (Continued)

ting the target data to the second control unit; and writing the target data to the second storage unit without accessing the second logical-to-physical mapping table.

19 Claims, 5 Drawing Sheets

(56) References Cited

U.S. PATENT DOCUMENTS

| | | | | |
|---|---|---|---|---|
| 6,529,458 | B1 ‡ | 3/2003 | Shin | G11B 7/00745 369/53.17 |
| 6,594,743 | B1 ‡ | 7/2003 | Chen | G06F 3/0601 360/13 |
| 7,370,025 | B1 ‡ | 5/2008 | Pandit | G06F 17/30212 707/610 |
| 7,865,475 | B1 ‡ | 1/2011 | Yadav | G06F 11/2069 707/655 |
| 8,954,670 | B1 ‡ | 2/2015 | Subramanian | G06F 11/2056 711/113 |
| 9,043,280 | B1 ‡ | 5/2015 | Patwardhan | G06F 11/1446 707/640 |
| 2004/0117344 | A1 ‡ | 6/2004 | Yang | G06F 11/2071 |
| 2005/0055520 | A1 ‡ | 3/2005 | Kappler | G06F 11/2069 711/162 |
| 2008/0007853 | A1 ‡ | 1/2008 | Wang | G11B 5/86 360/15 |
| 2009/0204648 | A1 ‡ | 8/2009 | Best | G06F 11/1451 |
| 2009/0249010 | A1 ‡ | 10/2009 | Kawada | G06F 11/1435 711/162 |
| 2010/0241806 | A1 * | 9/2010 | Kawano | G06F 11/1441 711/118 |
| 2011/0138112 | A1 * | 6/2011 | Chiang | G06F 3/0664 711/103 |
| 2012/0096335 | A1 * | 4/2012 | Takahashi | G06F 11/1068 714/773 |
| 2012/0272038 | A1 ‡ | 10/2012 | Wei | G06F 3/0613 711/206 |
| 2014/0075149 | A1 ‡ | 3/2014 | Pike | G06F 17/30091 711/206 |
| 2015/0254088 | A1 * | 9/2015 | Chou | G06F 3/067 709/212 |

OTHER PUBLICATIONS

English abstract translation of the Office Action letter of the counterpart Taiwan application 104131776 dated Nov. 18, 2016.‡
English abstract of TW201025005.‡
TW440766 is also granted as U.S. Pat. No. 6,594,743.‡

\* cited by examiner
‡ imported from a related application

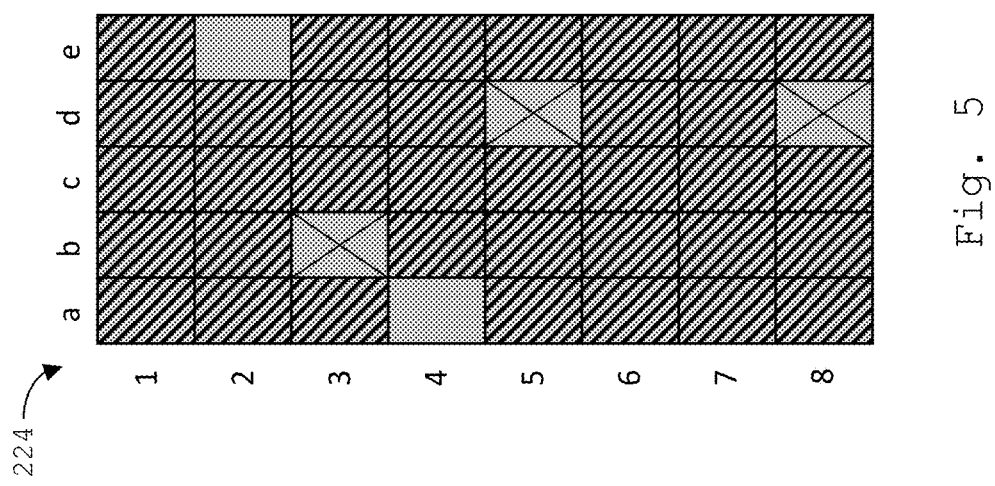

DATA BACKUP SYSTEM AND METHOD THEREOF WHEREIN TARGET DATA (IN SOURCE STORAGE) IS ARRANGED ACCORDING TO DEFECT TABLE OF TARGET STORAGE

CROSS REFERENCE TO RELATED APPLICATIONS

This application is a continuation of U.S. application Ser. No. 15/260,036, filed on Sep. 8, 2016, now patented as U.S. Pat. No. 10,216,451, which claims priority to Taiwan Application Serial Number 104131776, filed Sep. 25, 2015, which is herein incorporated by reference.

BACKGROUND OF THE INVENTION

1. Field of the Invention

This invention relates to a data backup system and a data backup method, especially to a data backup system and a data backup method for non-volatile storage devices.

2. Description of Related Art

With the popularity of flash memories, more and more computers and electronic products use storage devices made from flash memories, such as solid-state drives (SSDs), to replace conventional hard disk drives (HDDs). Due to limited service lives, the flash memories are subject to data backup when their service lives are about to end. FIG. 1 illustrates a conventional data backup operation of flash memory storage devices. The control unit 112 of the flash memory storage device 110 and the control unit 122 of the flash memory storage device 120 perform read and write operations on the flash memory 114 and the flash memory 124, respectively, according to their respective logical-to-physical mapping tables (hereinafter referred to as the L2P table). When an operating system on a host accesses the flash memory storage device 110 or the flash memory storage device 120, the file system module 140 refers to logical block addresses (LBAs) to obtain the logical address of a destination and issues access commands to the flash memory storage device 110 or the flash memory storage device 120 through the driver module 130. The access command contains the logical address of the destination. Then the control unit 112 or the control unit 122 translates the logical address of the destination to the physical address (PA) of the flash memory 114 or the flash memory 124 by referring to the L2P table.

Assuming that the data are about to be backed up from the flash memory storage device 110 (the source) to the flash memory storage device 120 (the destination), as indicated by the direction of the dotted line), the host keeps reading data from the flash memory storage device 110 and writing them into the flash memory storage device 120 during the backup process. As only a fixed amount of data are being read or written each time the file system module 140 accesses the flash memory storage device 110 and the flash memory storage device 120, such as 4 KB for each access, the times of read operations to completely read out the data in the flash memory storage device 110 are quite many. In addition, the data in the flash memory 114 are probably unorganized after a long use of the flash memory storage device 110, meaning that reading data out of the flash memory storage device 110 is accompanied by a huge amount of random accesses. The random access requires the control unit 112 to refer to the L2P table to translate the logical addresses to the physical addresses in each read operation, which is a time-consuming operation for the control unit 112 and therefore renders a long backup time. Moreover, in some cases where an operating system or applications may be installed in the flash memory storage device 110 as well, when a backup operation is being performed, only personal data, such as multimedia files and documents, are backed up by a user while the operation system and/or the applications are missing.

SUMMARY OF THE INVENTION

In view of the problems of the prior art, an object of the present invention is to provide a data backup system and method thereof, so as to make an improvement to the prior art.

The present invention discloses a data backup system for backing up target data. The system comprises a first storage device, a second storage device and a driver module. The first storage device comprises a first storage unit for storing the target data, and a first control unit for accessing the first storage unit according to a first logical-to-physical mapping table. The second storage device comprises a second storage unit, and a second control unit for accessing the second storage unit according to a second logical-to-physical mapping table. The driver module for accessing the first storage device and second storage device. During the processing of backing up the target data from the first storage device to the second storage device, the first control unit reads the target data from the first storage unit without accessing the first logical-to-physical mapping table and transmits the target data to the driver module, the driver module transmits the target data to the second control unit, and the second control unit writes the target data to the second storage unit without accessing the second logical-to-physical mapping table.

The present invention also discloses a data backup method for backing up target data, through a driver module, from a first storage device to a second storage device. The first storage device comprises a first storage unit that stores the target data and a first control unit that accesses the first storage unit according to a first logical-to-physical mapping table. The second storage device comprises a second storage unit and a second control unit that accesses the second storage unit according to a second logical-to-physical mapping table. The method comprises the steps of: reading the target data from the first storage unit without accessing the first logical-to-physical mapping table and transmitting the target data to the driver module; transmitting the target data to the second control unit; and writing the target data to the second storage unit without accessing the second logical-to-physical mapping table.

The backup system of this invention and its associated method employ a PA-to-PA approach to copy or transfer data so that the data are accessed continuously rather than randomly to improve the data backup efficiency.

These and other objectives of the present invention no doubt becomes obvious to those of ordinary skill in the art after reading the following detailed description of the preferred embodiments that are illustrated in the various figures and drawings.

BRIEF DESCRIPTION OF THE DRAWINGS

FIG. 5 illustrates the memory usage status of the flash memory storage device at the destination after the data backup process is completed.

DETAILED DESCRIPTION OF THE EMBODIMENTS

The following description is written by referring to terms of this technical field. If any term is defined in this specification, such term should be explained accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

Figure 1:
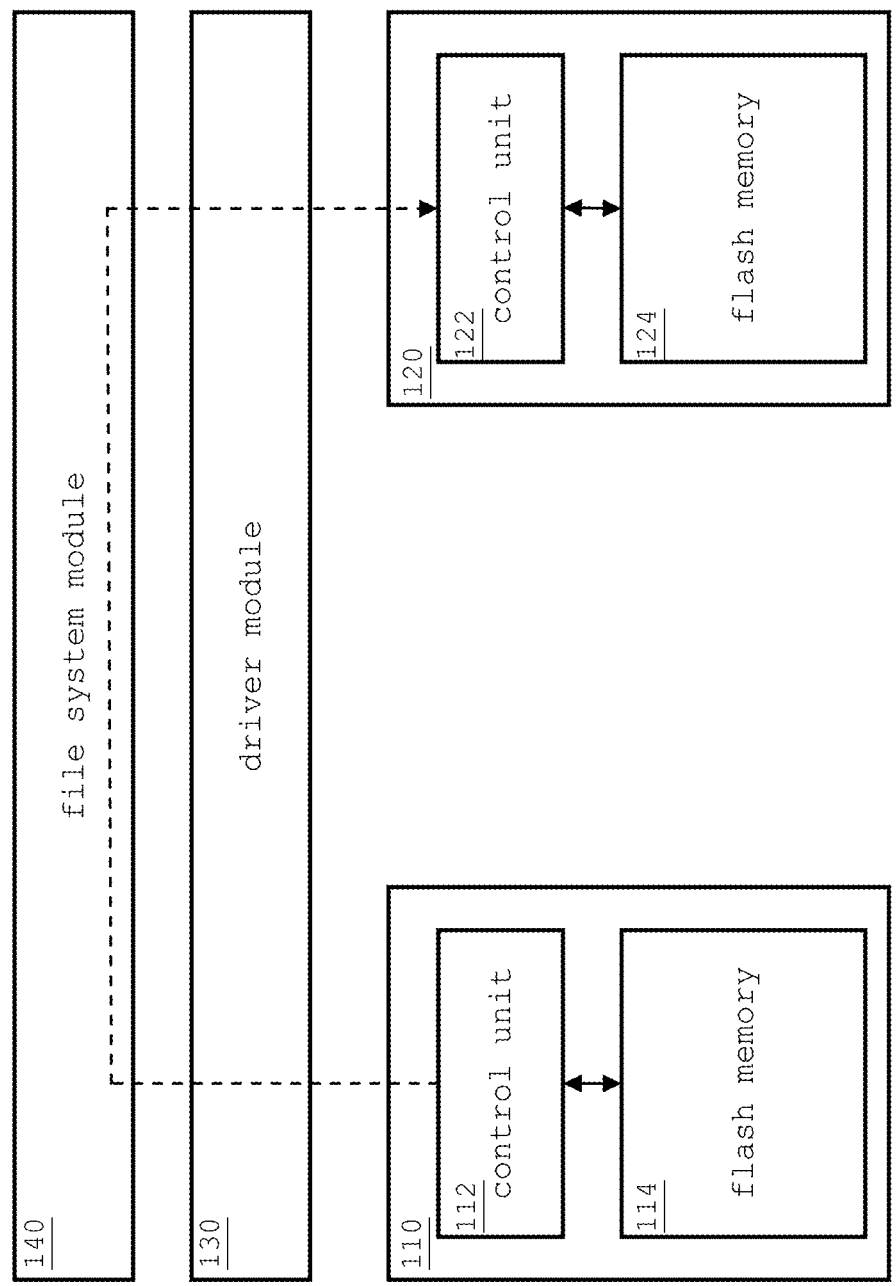
FIG. 1 illustrates a conventional data backup operation of flash memory storage devices.
Figure 2:
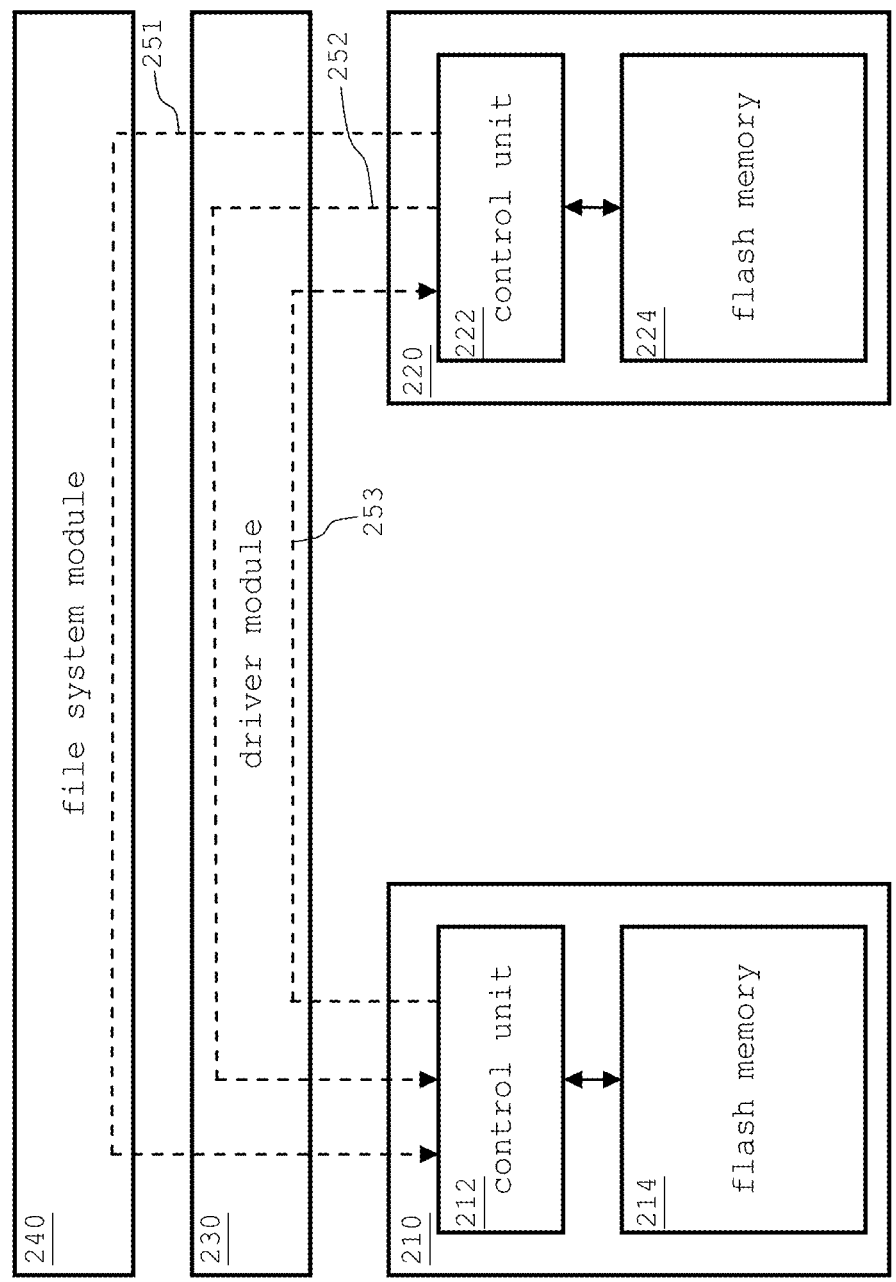
FIG. 2 illustrates the data backup operation of flash memory storage devices according to an embodiment of this invention.
Figure 3:
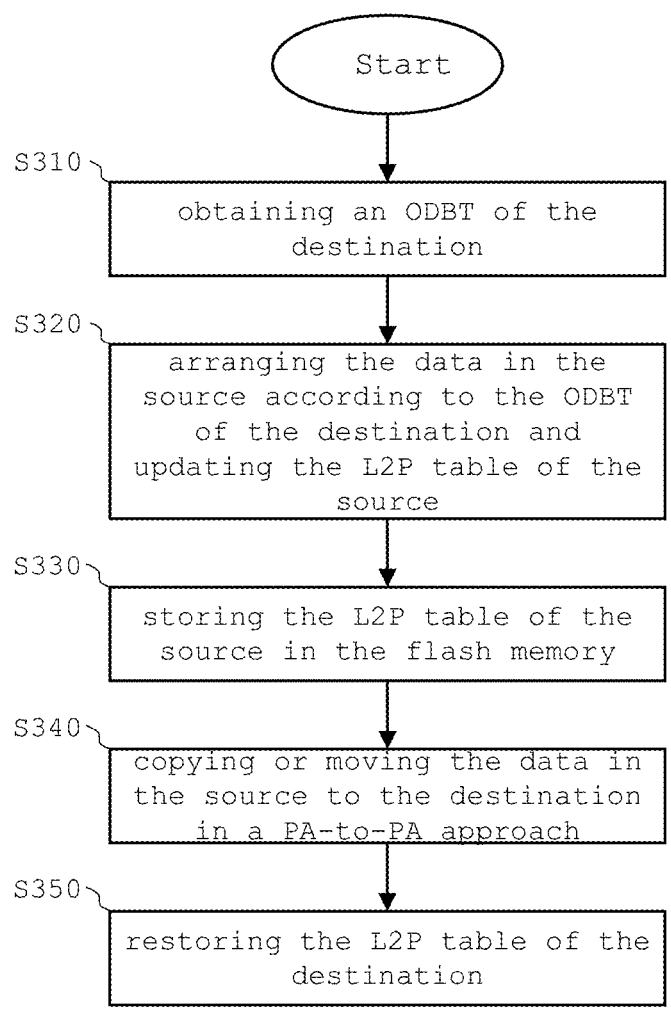
FIG. 3 illustrates the flowchart of the data backup operation corresponding to FIG. 2.
Figure 4:
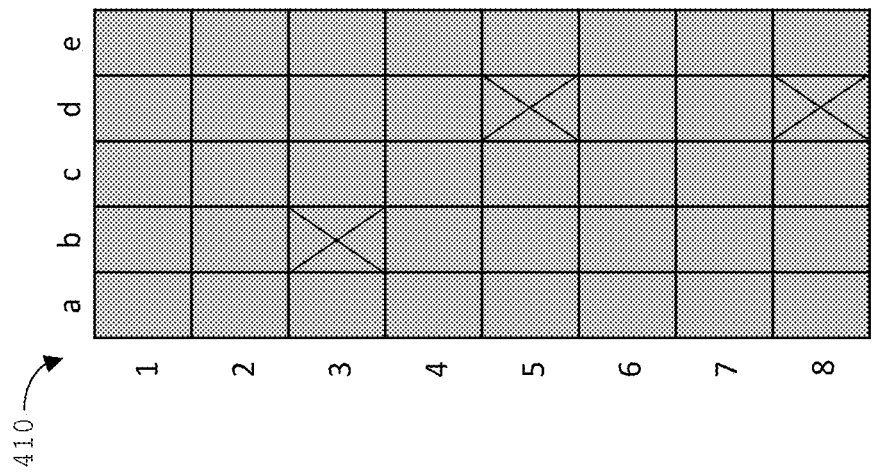
FIG. 4 illustrates an ODBT of the flash memory 224 at the destination and the memory usage status of the flash memory 214 at the source.
Figure 4:
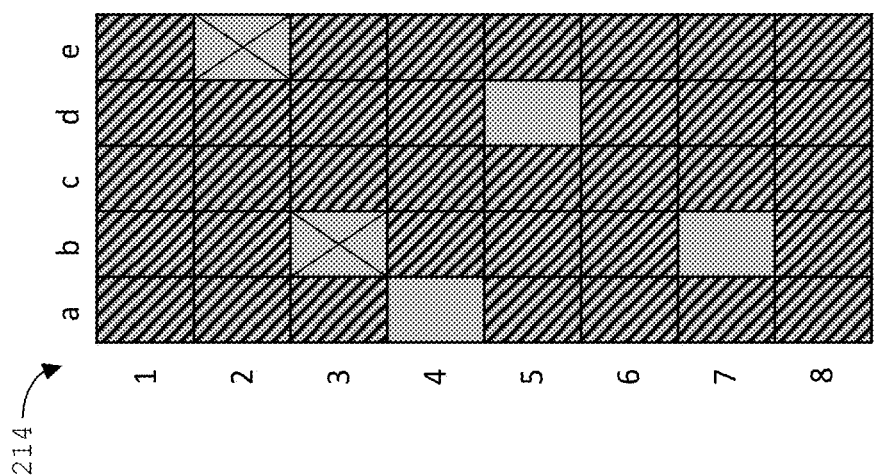

FIG. 2 illustrates the data backup operation of flash memory storage devices according to an embodiment of this invention. FIG. 3 illustrates the flowchart of the data backup operation corresponding to FIG. 2. In this embodiment, the data in the flash memory storage device 210 (the source) are backed up to the flash memory storage device 220 (the destination). Before the data in the flash memory storage device 210 are backed up to the flash memory storage device 220, an ODBT (Original Defect Block Table) of the flash memory 224 at the destination is read (step S310). Due to process variations, each flash memory has defects after it is made. The defect blocks cannot be used to store data. Each flash memory has different defect block positions, so each flash memory has its own ODBT after an inspection is carried out. By referring to the ODBT, a control unit is able to avoid these defect blocks during operations. FIG. 4 illustrates an ODBT of the flash memory 224 at the destination and the memory usage status of the flash memory 214 at the source. In this example, the 214 has 40 blocks; the blocks with "X" represent the deflective blocks (i.e., blocks e2 and b3); the blank blocks are unused block (i.e., blocks a4, b7 and d5); the shaded blocks are used blocks. The right-hand side of FIG. 4 shows the ODBT 410 of the flash memory 224, which is stored in the flash memory 224. The blocks b3, d5 and d8 are deflective blocks.

The ODBT 410 of the flash memory 224 can be read by a host and then transmitted to the control unit 212 of the flash memory storage device 210; in other words, the host reads the ODBT 410 of the flash memory 224 from the control unit 222 through the file system module 240 and the driver module 230 and then transmits the ODBT to the control unit 212, as indicated by the data path 251 in FIG. 2. Alternatively, the transmission of the ODBT 410 of the flash memory 224 is controlled by the driver module 230 instead of involving the operation of the file system module 240 in the above layer; in other words, the ODBT 410 is transmitted directly through an interface between the flash memory storage device 210 and the flash memory storage device 220, such as a PCI-E (Peripheral Component Interconnect Express) interface, as indicated by the data path 252 in FIG. 2.

After obtaining the ODBT 410 of the flash memory 224, the control unit 212 arranges the data in the flash memory 214 according to the ODBT 410 and updates the L2P table of the flash memory storage device 210 (step S320). In order that a PA-to-PA data copy or transfer process can proceed smoothly, the control unit 212 has to move the data in the flash memory 214 corresponding to the defect blocks at the destination to other unused block in advance. Taking FIG. 4 for example, the block b3 in the physical position is a defect block of the flash memory 224 and the block b3 of the flash memory 214 happens to be a defect block so the control unit 212 does not need to do anything; further, with regard to the defect block d5 of the flash memory 224, because the block d5 of the flash memory 214 is an unused block, the control unit 212 does not need to do anything either; with regard to the defect block d8 of the flash memory 224, because the block at the same physical position or physical address in the flash memory 214 is a used block, the control unit 212 moves the data in the block d8 to an unused block before the PA-to-PA data copy or transfer process to prevent data loss. In theory the data in the block d8 can be moved to one of the blocks a4, b7 and d5, but the data in the block d8 can be actually moved to the blocks a4 and b7 only since the block d5 corresponds to the defect block of the flash memory 224. After the data in the block d8 are arranged (may or may not involving movement of data, depending on the data distribution and the corresponding ODBT), the control unit 212 optionally modifies the L2P table of the flash memory storage device 210.

After the step S320 is completed, the control unit 212 stores the L2P table of the flash memory storage device 210 from a cache (e.g., a DRAM, not shown) of the control unit 212 to the flash memory 214 (step S330). The data (including the L2P table) in the flash memory 214 are in the appropriate physical addresses after the step S330 is completed, so the PA-to-PA data copy or transfer process can then be performed (step S340). Since the process of matching the data at the source and the usable spaces at the destination has been completed, the copy or transfer of data does not need to be processed by the file system module 240; instead, the copy or transfer of data can be processed via the data path 253 of FIG. 2 by the cooperation between the driver module 230 and the firmware of the flash memory storage device 210 as well as the firmware of the flash memory storage device 220. For example, the driver module 230 communicates with the firmware of the flash memory storage device 210 and the firmware of the flash memory storage device 220 based on pre-defined instructions or commands. Because the copy or transfer of data does not require the process of the file system module 240, the data amount in each access and/or transfer process is not limited to a default data access unit of the file system module 240. Thus, a unit of larger data amount (e.g., 32 KB, 64 KB, etc.), as opposed to the default data access unit (e.g., 4 KB), can be used for the copy or transfer of data; therefore the data backup efficiency can be increased as the access times of the flash memory storage device 210 and the flash memory storage device 220 are decreased. Moreover, when the transfer of data is not controlled by the file system module 240, the access commands transmitted between the flash memory storage device 210 and the flash memory storage device 220 do not include logical block addresses; that is, the copy or transfer of data that is not controlled by the file system module 240 does not involve the translation from the logical addresses to the physical addresses. To be specific, during the data copy or transfer process, the control unit 212 does is not required to access the L2P table of the flash memory storage device 210 and the control unit 222 is not required to access the L2P table of the flash memory storage device 220, and the data access is continuous rather than random.

For example, in one embodiment, the read commands the driver module 230 issues to the control unit 212 contain only the physical address and the length of the data (for example, the format of the read command may be (R,PA,L), with R indicating that the command is a read command, the PA representing the physical address and the L representing the data length), and the write command issued to the control unit 222 contains the same physical address and the same data length (for example, the format of the write command may be (W,PA,L,Dn), with W indicating that the command is a write command, Dn representing the data to be written). The read commands and the write commands of different access operations during the backup process are exemplified in table 1, where one access operation is defined to include reading the data from the flash memory storage device 210 and writing the data into the flash memory storage device 220. Note that the read commands and the write commands listed in table 1 contain only the parts related to the backup operation of this invention and may contain other parameters, and the order of parameters may also be different. Further, although the physical address and the data length L are represented in decimal format in this embodiment, they can alternatively be represented in other formats.

TABLE 1

| N-th access operation | Read command | Write command |
| --- | --- | --- |
| 1 | R,0000,64 | W,0000,64,D1 |
| 2 | R,0064,64 | W,0064,64,D2 |
| 3 | R,0128,64 | W,0128,64,D3 |
| ... | ... | ... |
| 11 | R,0640,64 | W,0640,64,D11 |
| 12 | R,0706,64 | W,0706,64,D12 |
| ... | ... | ... |

Assuming that the size of each block of the flash memory 214 and the 224 is 64 KB, the range of the physical address of the block a1 in FIG. 4 is 0000~0063, the range of the physical address of the block b1 in FIG. 4 is 0064~0127, and so on; it is also assumed that the data amount in each access operation is 64 KB. As shown in table 1, in a given access operation, the read command and the write command have the same physical address; in other words, the data read from the flash memory 214 are written into the flash memory 224 at the same physical address (i.e., the aforementioned PA-to-PA data copy or transfer process). Further, with regard to any two consecutive read commands (or write commands), the physical address of the subsequent read command (or write command) is identical to the physical address of the prior read command (or write command) shifted by the data length; that is, the data are read or written in a continuous manner during the data backup process. Taking the memory blocks of FIG. 4 for example, the first access operation reads the block a1 of the flash memory 214 and writes the data into the block a1 of the flash memory 224, the second access operation reads the block b1 of the flash memory 214 and writes the data into the block b1 of the flash memory 224, and so forth. FIG. 5 shows the memory usage status of the flash memory storage device at the destination after the data backup process is completed. The blank block e2 corresponds to the original defect block e2 of the flash memory 214, and the data which were in the block d8 of the flash memory 214 have been moved to the block b7 after the data backup process (assuming that the control unit 212 selected the block b7 rather than the block a4 in the step S320). Note that during the data copy or transfer process, if a set of data in the flash memory 214 cannot be read, the physical address of this set of data is skipped and the next set of data is read; similarly, if writing a set of data into the flash memory 224 fails, the physical address of this set of data is also skipped.

When all data are copied or transferred to the flash memory 224 of the flash memory storage device 220, the control unit 222 restores the L2P table by loading the L2P table in the flash memory 224 into its cache (not shown) and initializes the block information of the flash memory 224 (e.g., the erase times) so that the file system module 240 of the host is able to manipulate the flash memory storage device 220 the way it manipulates the flash memory storage device 210. Note that if the capacities of the flash memory 214 and the flash memory 224 are different, the control unit 222 modifies the L2P table in the step of restoring the L2P table to match the actual usage scenarios of the flash memory storage device 220, such as expanding the range of mapping the logical addresses to the physical address in accordance with the actual capacity of the flash memory 224.

In summary, as opposed to the conventional technology, this invention substantially reduces the access times and does not require the translation between the logical addresses and the physical addresses, which greatly speeds up the data backup process of flash memory storage devices. In addition, the aforementioned flash memory storage device is only an exemplary embodiment of this invention; the data backup method disclosed in this invention can also be applied to the PA-to-PA data copy or transfer process between 2 flash memories (e.g., flash drives). As long as the data at the source are arranged in advance according to the ODBT of the destination, the data loss can be prevented. Because this invention copies or moves the data (including L2P table) in the flash memory at the source completely to the destination, the operating system and/or applications at the source are copied or moved as well, which is convenient to clone a storage device. Here clone means copying or moving the entire data (including system data and user data) in the storage device at the source to a storage device at the destination. This invention is applicable to NAND and NOR flash memories, and in addition to personal computers, this invention can also be used in storage servers. When a storage server uses flash memory storage devices as storage media, this invention can also be used to clone the flash memory storage devices to greatly reduce the time required to reconstruct a RAID (Redundant Array of Independent Disks).

Since people of ordinary skill in the art can appreciate the implementation detail and the modification thereto of the present method invention of FIG. 3 through the disclosure of the device invention of FIGS. 2, 4 and 5, repeated and redundant description is thus omitted. Please note that there is no step sequence limitation for the method inventions as long as the execution of each step is applicable. Furthermore, the shape, size, and ratio of any element and the step sequence of any flow chart in the disclosed figures are just exemplary for understanding, not for limiting the scope of this invention.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A system, comprising:
   a first storage device, comprising:
      a first storage configured to store a target data;
      and the first storage device configured to access the first storage according to a first mapping table;
   a second storage device, comprising:
      a second storage, wherein the second storage stores an original defect block table that describes defect blocks of the second storage;
      and the second storage device configured to access the second storage according to a second mapping table;
   and a driver configured to access the first storage device and second storage device;
   wherein during a process of backing up data, arranging the target data in the first storage according to the original defect block table, updating the first mapping table, and transmitting the target data to the second storage device through the driver.

2. The system of claim 1, wherein in the process of backing up data, the first mapping table and the second mapping table need not be referred.

3. The system of claim 1, wherein the original defect block table is transmitted to the first storage device through the driver.

4. The system of claim 1 further comprising:
   a file system, coupled to the driver and configured to access the first storage device by a default data amount during a process of non-backing up data;
   wherein, during the process of backing up data, the target data are not processed by the file system.

5. The system of claim 4, wherein data amount in each data transfer between the first storage device and the second storage device in the process of backing up data is larger than the default data amount.

6. The system of claim 4, wherein the original defect block table is transmitted to the first storage device through the file system and the driver.

7. The system of claim 1, wherein during the process of backing up data, a plurality of sets of data are read from the first storage in a plurality of consecutive read operations.

8. The system of claim 7, wherein, during the process of backing up data, the plurality of sets of the read data are written into the second storage in a plurality of consecutive write operations and are consecutive data in physical addresses.

9. The system of claim 1, wherein a physical address of the second storage to which the target data are written circuit is identical to a physical address of the first storage circuit where the target data are stored.

10. The system of claim 1, wherein the first storage device and the second storage device are flash memory storage devices, and the first storage and the second storage are flash memories.

11. A process of backing up data, through a driver, from a first storage device to a second storage device, the first storage device comprising a first storage that stores a target data, the first storage device configured to access the first storage according to a first mapping table, the second storage device comprising a second storage, the second storage device configured to access the second storage according to a second mapping table, the process of backing up data comprising:
   arranging the target data in the first storage according to an original defect block table of the second storage, wherein the original defect block table describes defect blocks of the second storage;
   updating the first mapping table according to the original defect block table of the second storage; and
   transmitting the arranged target data in the first storage to the second storage via the driver.

12. The process of backing up data of claim 11, wherein during the process of backing up data, the first mapping table and the second mapping table need not be referred.

13. The process of backing up data of claim 11, further comprising:
   transmitting the original defect block table in the second storage to the first storage device through the driver.

14. The process of backing up data of claim 11, wherein, during a process of non-backing up data, a data access operation on the first storage device is performed by a file system by a default data amount;
   wherein during the process of backing up data, the target data are not processed by the file system.

15. The process of backing up data of claim 14, wherein during the process of backing up data, data amount in each data transfer between the first storage device and the second storage device is larger than the default data amount.

16. The process of backing up data of claim 14, wherein the original defect block table is transmitted to the first storage device through the file system.

17. The process of backing up data of claim 11, wherein during the process of backing up data, a plurality of sets of data read from the first storage in a plurality of consecutive read operations are consecutive data in physical addresses.

18. The process of backing up data of claim 17, wherein, during the process of backing up data, the plurality of sets of the read data are written into the second storage in a plurality of consecutive write operations and are consecutive data in physical addresses.

19. The process of backing up data of claim 11, wherein a physical address of the second storage to which the target data are written is identical to a physical address of the first storage where the target data are stored.

* * * * *